United States Patent
Zhang et al.

(10) Patent No.: US 11,368,276 B2
(45) Date of Patent: Jun. 21, 2022

(54) PHASE CALIBRATION METHOD AND DEVICE

(71) Applicant: DATANG MOBILE COMMUNICATIONS EQUIPMENT CO., LTD, Beijing (CN)

(72) Inventors: Yong Zhang, Beijing (CN); Jing Shi, Beijing (CN); Qinghua Li, Beijing (CN); Lihua Ni, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 29 days.

(21) Appl. No.: 17/051,450

(22) PCT Filed: Jan. 21, 2019

(86) PCT No.: PCT/CN2019/072546
§ 371 (c)(1),
(2) Date: Oct. 29, 2020

(87) PCT Pub. No.: WO2019/218721
PCT Pub. Date: Nov. 21, 2019

(65) Prior Publication Data
US 2022/0094516 A1    Mar. 24, 2022

(30) Foreign Application Priority Data

May 17, 2018    (CN) .......................... 201810476382.3

(51) Int. Cl.
*H04K 1/10* (2006.01)
*H04L 27/28* (2006.01)
*H04L 7/00* (2006.01)

(52) U.S. Cl.
CPC ................................ *H04L 7/0016* (2013.01)

(58) Field of Classification Search
CPC ...... H04L 7/0016; H04L 7/0029; H04L 27/38
(Continued)

(56) References Cited

U.S. PATENT DOCUMENTS

| 4,937,535 A | 6/1990 | Underwood et al. |
| 5,594,452 A | 1/1997 | Webber et al. |
(Continued)

FOREIGN PATENT DOCUMENTS

| CN | 101682432 A | 3/2010 |
| CN | 102386953 A | 3/2012 |
(Continued)

OTHER PUBLICATIONS

Hsieh M-H et al: "Channel Estimation for OFDM Systems Based on Comb-Type Pilot Arrangement in Frequency Selective Fading Channels", IEEE Transactions on Consumer Electronics, IEEE Service Center, New York, NY, US, vol. 44, No. 1, Feb. 1, 1998 (Feb. 1, 1998), pp. 217-225, XP000779270, ISSN: 0098-3063, DOI: 10.1109/30.663750, section II; figure 1, section IV .A.

(Continued)

*Primary Examiner* — Phuong Phu
(74) *Attorney, Agent, or Firm* — Bayramoglu Law Offices LLC (57) ABSTRACT

A phase calibration method includes: segmenting a received measurement sequence according to a preset rule; respectively determining a phase calibration factor of each of segmented measurement sequences, wherein the each of the segmented measurement sequences respectively corresponds to a segmented phase; and when performing a phase calibration on a sequence to be verified, according to a matching relation between a phase of the sequence to be verified and the each of the segmented phases, using the phase calibration factor corresponding to a matched segmented phase to perform the phase calibration on the (Continued)

Segment a received measurement sequence according to a preset rule — 101

Respectively determine a phase calibration factor of each of the segmented measurement sequences, wherein each of the segmented measurement sequences respectively corresponds to a segmented phase — 102

When performing phase calibration on a sequence to be verified, according to a matching relation between a phase of the sequence to be verified and each of the segmented phases, use the phase calibration factor corresponding to the matched segmented phase to perform phase calibration on the sequence to be verified — 103 sequence to be verified. The embodiments of the phase calibration method and the device are equivalent to dividing a non-linear measurement sequence into several approximately linear measurement sequences, and then calibrating each of the several approximately linear measurement sequences using a corresponding phase calibration factor respectively.

11 Claims, 5 Drawing Sheets

(58) Field of Classification Search
USPC ........ 375/260, 346, 371, 340, 324, 326, 316
See application file for complete search history.

(56) References Cited

U.S. PATENT DOCUMENTS

| | | | |
|---|---|---|---|
| 6,861,975 | B1 | 3/2005 | Coleman Jr. et al. |
| 10,218,548 | B1* | 2/2019 | Lohning ............... H04L 7/0029 |
| 2011/0122016 | A1 | 5/2011 | Lomes et al. |
| 2016/0013961 | A1* | 1/2016 | Dore ....................... H04L 27/38 |
| | | | 375/316 |

FOREIGN PATENT DOCUMENTS

| | | |
|---|---|---|
| CN | 103926549 A | 7/2014 |
| CN | 106160882 A | 11/2016 |
| JP | 2005505167 A | 2/2005 |
| JP | 2006279900 A | 10/2006 |
| JP | 2010518688 A | 5/2010 |
| JP | 2014103671 A | 6/2014 |
| WO | 2016078040 A1 | 5/2016 |
| WO | 2017157122 A1 | 9/2017 |
| WO | 2017206080 A1 | 12/2017 |

OTHER PUBLICATIONS

Mark Last et al: "Segmenting Time Series: A Survey and Novel Approach", In: "Progress in Computer Vision and Image Analysis", Jun. 1, 2004 (Jun. 1, 2004), World Scientific, XP055606424, ISSN:1793-0839, ISBN: 978-981-2834-46-1, vol. 57, pp. 1-21, DOI: 10.1142/9789812565402_0001, section 2.

* cited by examiner

PHASE CALIBRATION METHOD AND DEVICE

CROSS-REFERENCE TO RELATED APPLICATIONS

This application is the national stage entry of International Application No. PCT/CN2019/072546, filed on Jan. 21, 2019, which is based upon and claims priority to Chinese Patent Application No. 201810476382.3, filed on May 17, 2018, the entire contents of which are incorporated herein by reference.

TECHNICAL FIELD

The disclosure relates to the field of signal processing technologies, and more particularly, to a phase calibration method and a phase calibration device.

BACKGROUND

In the field of communications, there is usually a phase error when a receiving end receives a signal or a sending end sends a signal due to performances of an analog device or a transmission network, so that it is necessary to perform phase calibration on the sending end or the receiving end.

Taking the phase calibration performed on the receiving end as an example, a method in the prior art is as follows: 1. a measurement sequence with a length of N frequency intervals is generated at a frequency interval $\Delta f$ in a full-bandwidth in a frequency domain; 2. the measurement sequence is transmitted to the receiving end; 3. channel estimation is performed after the receiving end receives the measurement sequence to obtain a frequency response $H_{est}(i)$ of the channel, wherein i=0, 1, . . . , N−1, and $H_{est}(i)$ represents an amplitude and a phase of a sampling point in the measurement sequence at an $i^{th}$ frequency interval; 4. after taking the phase of each sampling point from $H_{est}(i)$, a: linear fitting may be performed on N1 (0<N1<N) phases to obtain an initial phase of the measurement sequence; and b: a phase difference of the measurement sequence between various frequency intervals may be calculated, and all the phase differences in the full-bandwidth are averaged to obtain an average phase difference of the measurement sequence in the full-bandwidth; 5. linear fitting is performed on the full-bandwidth according to the initial phase and the average phase difference to obtain a fitting phase in the full-bandwidth; 6. table lookup is performed according to the fitting phase to obtain a phase calibration factor in the full-bandwidth; and 7. phase calibration is performed.

However, it has been found by those skilled in the art find during the course of studying the above technical solution that the above technical solution has the following defects: due to an imperfect phase-frequency characteristic of the analog device or the transmission network serving as the receiving end or the sending end, even if only one segment of measurement sequence is sent or received, the measurement sequence cannot be ensured to be a full-linear phase in the full-bandwidth. In other words, the phase difference of the measurement sequence at each frequency interval may be quite different in the whole frequency-band. Only one linear fitting is performed on the phase of the whole frequency-band in the full-bandwidth in the prior art, and when performing phase calibration, using the phase calibration factor acquired by uniform fitting of the full-bandwidth will cause a relatively larger error, and cannot achieve an excellent phase calibration effect.

SUMMARY

In light of the above problems, a phase calibration method and a phase calibration device according to embodiments of the disclosure are proposed to solve or partially solve the problem of big phase calibration error.

According to a first aspect of the disclosure, there is provided a phase calibration method, including:

segmenting a received measurement sequence according to a preset rule;

respectively determining a phase calibration factor of each of the segmented measurement sequences, wherein each of the segmented measurement sequences respectively corresponds to a segmented phase; and when performing phase calibration on a sequence to be verified, according to a matching relation between a phase of the sequence to be verified and each of the segmented phases, using the phase calibration factor corresponding to the matched segmented phase to perform phase calibration on the sequence to be verified.

According to a second aspect of the disclosure, there is provided a phase calibration device, including:

a segmenting module configured to segment a received measurement sequence according to a preset rule;

a phase calibration factor determining module configured to respectively determine a phase calibration factor of each of the segmented measurement sequences, wherein each of the segmented measurement sequences respectively corresponds to a segmented phase; and a phase calibrating module configured to, when performing phase calibration on a sequence to be verified, according to a matching relation between a phase of the sequence to be verified and each of the segmented phases, use the phase calibration factor corresponding to the matched segmented phase to perform phase calibration on the sequence to be verified.

In order to solve the foregoing problem, the embodiments of the disclosure disclose a computer program, including a computer readable code that, when executed on an electronic device, causes the electronic device to perform the method mentioned above.

In order to solve the foregoing problem, the embodiments of the disclosure further disclose a computer readable medium stored with the computer program therein.

The embodiments of the disclosure include the following advantages. According to the embodiments of the disclosure, the received measurement sequence is segmented according to the preset rule; since the length of the segmented measurement sequence is short and the phase in each segment is approximately linear, after determining the phase calibration factors of each of the segmented measurement sequences respectively, the phase calibration on each of the corresponding segmented measurement sequences is completed according to the phase calibration factors of each of the segmented measurement sequences, which are equivalent to dividing a non-linear measurement sequence into several approximately linear measurement sequences, and then calibrating each of the approximately linear measurement sequences using the corresponding phase calibration factor respectively, thereby greatly improving a phase calibration accuracy, and achieving an excellent phase calibration effect.

The above description is only a summary of the technical solutions of the disclosure. To understand the technical means of the disclosure more clearly so that the disclosure can be implemented according to the contents of the specification, and to make the above and other objects, features and advantages of the disclosure more obvious and understandable, the specific embodiments of the disclosure are specially illustrated hereinafter.

BRIEF DESCRIPTION OF THE DRAWINGS

Various other advantages and benefits will become apparent to those of ordinary skills in the art upon reading the following detailed description of preferred embodiments. The accompanying drawings are only for the purpose of illustrating the preferred embodiments and are not to be deemed as limiting the disclosure. Moreover, the same reference symbols are used to represent the same parts throughout the accompanying drawings. In the drawings.

DETAILED DESCRIPTION OF THE EMBODIMENTS

In order to make the above objects, features and advantages of the disclosure be more clearly understood, the disclosure will be described in further detail below with reference to the drawings and detailed description.

It should be understood that the specific embodiments described herein are only for the purpose of explaining the disclosure, are only a part of the embodiments of the disclosure rather than all of the embodiments, and are not used to limit the disclosure.

First Embodiment

Figure 1:
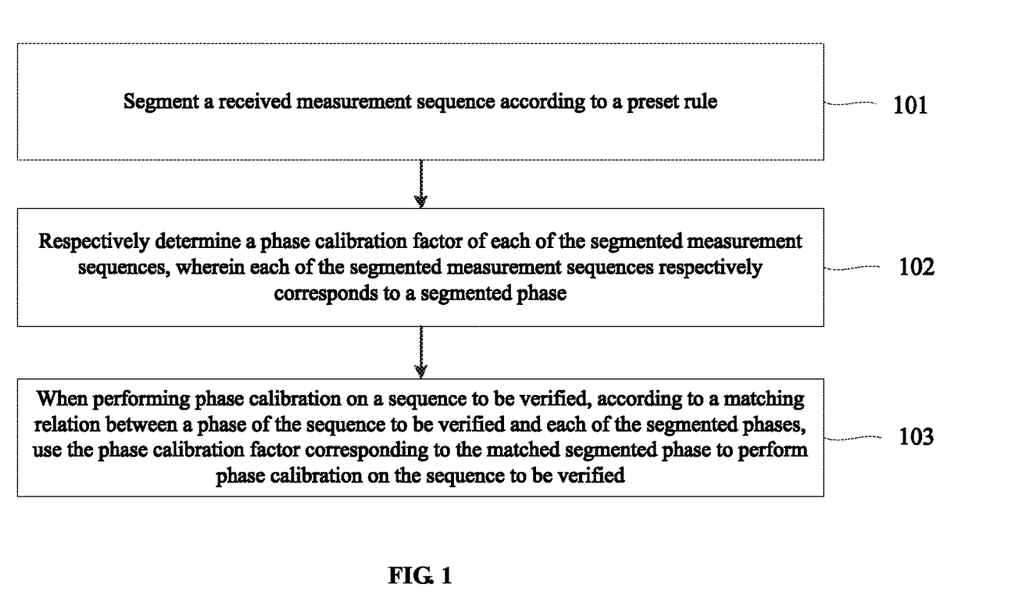
FIG. 1 is a flow chart of a phase calibration method provided by an embodiment of the disclosure.

Refer to FIG. 1, which illustrates a flow chart of a phase calibration method.

The method may specifically include the following steps.

In step 101, a received measurement sequence is segmented according to a preset rule.

In the embodiment of the disclosure, the measurement sequence may be sent from the sending end to the receiving end through a transmission channel such as a cable, a transmission network, etc. After the receiving end receives the measurement sequence, the received measurement sequence may be segmented according to the preset rule.

In the embodiment of the disclosure, the preset rule may specifically be: setting a fixed frequency interval for segmenting; may also be: after setting a frequency interval of a first segment, segmenting a following second segment, a following third segment and the like according to an increasing or decreasing rule; and may also be: segmenting according to a certain segmenting algorithm, such as a segmenting block algorithm, a greedy segmenting algorithm, etc. No matter which preset rule is used to segment the received measurement sequence, a function of the present rule is to divide the received measurement sequence into several segments, so that the length of each segmented measurement sequence is smaller than the original measurement sequence, and a linear phase of each segmented measurement sequence is better than that of the original measurement sequence. Those skilled in the art may select an adaptive preset rule according to the actual application scenarios, and the specific contents of the preset rule are not specifically limited in the embodiment of the disclosure.

As a preferred solution of the embodiment of the disclosure, the step of segmenting the received measurement sequence according to the preset rule includes: segmenting the received measurement sequence by a greedy segmenting algorithm in a frequency domain.

During specific application, the measurement sequence may be a measurement sequence with a length of N frequency intervals generated in a full-bandwidth of the frequency domain at a preset frequency interval $\Delta f$, wherein N is a natural number greater than 2.

Due to performance reasons of devices serving as the sending end, the transmission channel and the receiving end, the measurement sequence received by the receiving end will have deviation from the actual measurement sequence. After the receiving end receives the measurement sequence, a channel frequency response based on the sending end, the transmission channel and the receiving end through a comparison relation between the actual measurement sequence and the received measurement sequence may be determined, and recorded as $H_{est}(i)$, wherein $i=0, 1, \ldots, N-1$, and N is a length of the measurement sequence. each frequency interval corresponds to one sampling point in the received measurement sequence, and a phase (I) of the sampling point in the measurement sequence corresponding to an $i^{th}$ frequency interval may be obtained from $H_{est}(i)$, wherein $i=0, 1, \ldots, N-1$; conjugate correlation is performed on $H_{est}(i)$ between adjacent sampling points to obtain a correlation result that: $H_{corr}(i)=H_{est}(i+1)*(H_{est}(i))$, wherein $H_{corr}(i)$ refers to a conjugate correlation result of a channel frequency response between the adjacent sampling points, and a phase difference $\Delta\varphi(i)$ between the two adjacent sampling points may be obtained from $H_{corr}(i)$, wherein $i=0, 1, \ldots, N-2$.

Preferably, the specific step of segmenting the measurement sequence by the greedy segmenting algorithm in the frequency domain may be as follows.

In step A1, a first segmenting length of a first segmented measurement sequence in the received measurement sequence is determined, wherein an initial value of the first segmenting length is a maximum segment interval $N_{max}$ of the measurement sequence, and the maximum segment interval $N_{max}$ includes at most N/2 frequency intervals, When the greedy segmenting algorithm is used to segment the received measurement sequence, the maximum possible segment interval is used as the initial value for the segmenting in each time. The embodiment of the disclosure relates to a case where the received measurement sequence is segmented in the full-bandwidth.

In the embodiment of the disclosure, since the length of the received measurement sequence is equal to N frequency intervals, the maximum segmenting interval $N_{max}$ while segmenting the received measurement sequence may be set as including at most N/2 frequency intervals, and then the initial value of the first segmenting length of the first segmented measurement sequence may be determined as $N_{max}$. It can be understood that a number of frequency intervals contained in minimum segmenting may also be set as $N_{min}$ according to the actual situations, and the length of the first segmenting length needs to be kept no less than $N_{min}$ in subsequent steps.

In step A2, a phase slope k of the first segmented measurement sequence is determined.

During specific application, when the first segmenting length is equal to $N_{max}$ frequency intervals, sampling points i contained in the $N_{max}$ frequency intervals may be determined, and the phase slope k of the first segmented measurement sequence may be obtained by averaging $\Delta\varphi(i)$ corresponding to the adjacent sampling points (i, i+1) included in the $N_{max}$ frequency intervals.

In step A3, a first phase fitting curve $\varphi'(i)=k*f_{idx}+b$ of the first segmented measurement sequence is determined through the phase slope and an initial phase value b of the first segmented measurement sequence, wherein fax is a frequency interval index.

During specific application, the initial phase value b is obtained by performing linear fitting on the phase $\varphi(i)$ of each sampling point in the first segmented measurement sequence. For example, the phase $\varphi(i)$ of each sampling point in the first segmented measurement sequence may be averaged to obtain the initial phase b, and a following linear fitting formula may be used in calculating the initial phase b:

$$b = \frac{1}{N1}\sum_{i=1}^{N1}\varphi(i) - \frac{1}{N1}\sum_{i=1}^{N1}\Delta\varphi(i) * \frac{N1+1}{2}$$

wherein, $$\frac{1}{N1}\sum_{i=1}^{N1}\varphi(i)$$

represents an average phase in the first segmenting;

$$\frac{1}{N1}\sum_{i=1}^{N1}\Delta\varphi(i)$$

represents an average phase difference in the first segmenting; and $$\frac{N1+1}{2}$$

represents a frequency position of the average phase in the segmenting.

Therefore, the first phase fitting curve may be obtained according to the phase slope k and the initial phase b:

$$\varphi'(i)=k*f_{idx}+b$$

wherein, tax is a frequency interval index; and specifically, $f_{idx}=i*\Delta f$, i.e., a frequency value of an $i^{th}$ sampling point in the first phase fitting curve.

In step A4, a difference between a first fitting phase of each of the sampling points determined according to the phase fitting curve and an actual phase of each of the sampling points of the first segmented measurement sequence is determined.

In the embodiment of the disclosure, considering that the first phase fitting curve obtained according to the segmenting method of the maximum segmenting interval $N_{max}$ is not necessarily accurate, a quality of the first segmented measurement sequence needs to be detected and optimized according to the detection.

During specific application, fax may be substituted into the first phase fitting curve to obtain a corresponding $\varphi'(i)$ by calculating, and a difference between $\varphi'(i)$ and the actual phase $\varphi(i)$ actually corresponding to $f_{idx}$ is calculated.

In step A5, if the difference is greater than a preset difference threshold, a number of the frequency intervals contained in the first segmenting length is reduced.

During specific application if a phase standard deviation in the first segmenting is recorded as $\sigma_{std}$, the preset difference threshold value may be $c*\sigma_{std}$, wherein c is a natural number greater than 1, and a specific value of c may be set according to actual application scenarios. For example, in an application scenario requiring accurate phase calibration, c may be set to a smaller value, while in an application scenario not requiring accurate phase calibration, c may be set to a larger value, and this is not limited in the embodiment of the disclosure.

When the difference between $\varphi'(i)$ and $\varphi(i)$ is greater than the preset difference threshold, it can be considered that the length of the first segmenting is too large and needs to be optimized to reduce the number of frequency intervals contained in the first segmenting length.

A specific method of reducing the number of frequency intervals contained in the first segmenting length may be: reducing the fixed $\Delta N$ frequency intervals; and may also be: reducing according to a proportion $\mu$ ($0<\mu<1$) and rounding a product of $\mu$ and the first segmenting length. Those skilled in the art may also reduce the number of frequency intervals contained in the first segmenting length through other methods according to the actual situations, and this is not limited in the embodiment of the disclosure.

In step A6, after the first segmenting length is reduced, steps A1 to A5 may be repeated until the first segmenting length N1 with a difference no more than the present different threshold and the first phase fitting curve are determined, then the first segmented measurement sequence is determined and the first segmenting is completed.

In step A7, After the first segmenting is completed, second segmenting is performed, wherein N1 is used as an initial value of a second segmenting length of a second segmented measurement sequence in the second segmented measurement sequence, and the second segmenting length N2 with a difference no more than the preset difference threshold and a second phase fitting curve are determined by using a method similar to the first segmenting, so as to completely segment the second segmented measurement sequence.

In step A8, by analogy, a third segmented measurement sequence, a fourth segmented measurement sequence, . . . , may be completely segmented to finally make all the segment lengths that N1+ . . . +Nn=N, so that the received measurement sequence is completely segmented.

As another preferred solution of the embodiment of the disclosure, when the received measurement sequence is symmetric full-bandwidth measurement sequence, the step of segmenting the received measurement sequence according to the preset rule includes the following steps.

In step B1, a center frequency is taken as a boundary to divide the full-bandwidth measurement sequence into a first frequency-band measurement sequence and a second frequency-band measurement sequence, wherein phase slopes of the first frequency-band measurement sequence and the second frequency-band measurement sequence are symmetric at the center frequency.

In step B2, first segmenting is performed on the first frequency-band measurement sequence by a greedy segmenting algorithm in a frequency domain.

In step B3, according to a symmetric relation between the slopes of the first frequency-band measurement sequence and the second frequency-band measurement sequence, second segmenting corresponding to the first segmenting is employed in the second frequency-band measurement sequence.

In the embodiment of the disclosure, the center frequency may be taken as the boundary to divide the full-bandwidth measurement sequence into the first frequency-band measurement sequence and the second frequency-band measurement sequence, the first frequency-band measurement sequence and the second frequency-band measurement sequence are approximately symmetric at the center frequency, while the first frequency-band measurement sequence and the second frequency-band measurement sequence are also approximately symmetric at the center frequency. Therefore, after the first frequency-band measurement sequence is segmented according to the greedy segmenting algorithm, the same segmenting can be performed on the second frequency-band measurement sequence according to the symmetric relation between the slopes of the first frequency-band measurement sequence and the second frequency-band measurement sequence, thus quickly segmenting the second frequency-band measurement sequence, which can reduce a computation burden by nearly a half, and greatly improve a segmenting efficiency.

During specific application, both the first frequency-band measurement sequence and the second frequency-band measurement sequence can be a positive frequency-band measurement sequence or a negative frequency-band measurement sequence, i.e., the positive frequency-band measurement sequence may be segmented first, and then the negative frequency-band measurement sequence may be segmented using the same way according to a symmetrical relation between the negative frequency-band measurement sequence and the positive frequency-band measurement sequence. Alternatively, the negative frequency-band measurement sequence may be segmented first, and then the positive frequency-band measurement sequence may be segmented using the same way according to the symmetrical relation between the positive frequency-band measurement sequence and the negative frequency-band measurement sequence, which is not specifically limited in the embodiment of the disclosure.

The principle of performing first segmenting on the first frequency-band measurement sequence by the greedy segmenting algorithm in the frequency domain is similar to steps A1 to A8. The difference is that in the embodiment of the disclosure, when the sum of the segmenting is that N1+, . . . , +Nn=N/2, the first segmenting of the first frequency-band measurement sequence is completed. A specific implementation process will not be elaborated herein.

In step 102, a phase calibration factor of each of the segmented measurement sequences is respectively determined, wherein each of the segmented measurement sequences respectively corresponds to a segmented phase.

In the embodiment of the disclosure, after the segmenting is completed, a fitting phase corresponding to the sampling points contained in the segmented measurement sequence, i.e., the segmented phase, may be determined through the corresponding phase fitting curve $\varphi'(i)=k*f_{idx}+b$ in each segmented measurement sequence. During specific application, the segmented phase may be an average value of $\varphi'(i)$ corresponding to all the sampling points contained in the segmented measurement sequence. For each segmented phase, a cordic (Coordinate Rotation Digital Computer) or look-up table method may be used to obtain the phase calibration factor of each segmented measurement sequence.

As a preferred solution of the embodiment of the disclosure, and based on the steps A1 to A8, the step of respectively determining the phase calibration factor of each of the segmented measurement sequences includes the following steps.

In step C1, linear fitting is performed on each of the segmented measurement sequences according to a preset resolution $\Delta f_{res}$ to obtain a second fitting phase of each of the segmented measurement sequences in unit of the preset resolution, wherein the preset resolution $\Delta f_{res}$ is smaller than the frequency interval $\Delta f$.

In step C2, a phase calibration factor corresponding to each of the second fitting phases is respectively determined.

In the embodiment of the disclosure, the resolution $\Delta f_{res}$ needed in each segment may be preset in view of the application scenario requiring accurate phase calibration, and $\Delta f_{res}$ is smaller than the frequency interval $\Delta f$. During specific application, it may be set that $\Delta f=M*\Delta f_{res}$, wherein M is a positive integer, thus reducing a complexity of the linear fitting. Of course, those skilled in the art may set the corresponding $\Delta f_{res}$ according to the actual situations, and this is not specifically limited in the embodiment of the disclosure.

According to a corresponding relation between $\Delta f_{res}$ and $\Delta f$, each segmented measurement sequence may be linearly fitted to obtain a second fitting phase of each segmented measurement sequence in unit of the preset resolution. For each second fitting phase, the cordic or look-up table method may be used to obtain the phase calibration factors of each segmented measurement sequence.

In step 103, when performing phase calibration on a sequence to be verified, according to a matching relation between a phase of the sequence to be verified and each of the segmented phases, the phase calibration factor corresponding to the matched segmented phase is used to perform phase calibration on the sequence to be verified.

During specific application, after determining each segmented phase and the phase calibration factors corresponding to each segmented phase through the measurement sequence, when there is a sequence to be verified requiring phase calibration, a phase of the sequence to be verified may be matched with each segmented phase, and if the phases are matched, the phase calibration factor corresponding to the matched segmented phase is employed to perform phase calibration on the sequence to be verified. It can be understood that the sequence to be verified may have multiple phases, and after matching the multiple phases with each segmented phase, different phases may be matched with multiple segmented phases, so that accurate calibration can be realized in different phase parts of the sequence to be verified by using different phase calibration factors.

It can be understood that the embodiment of the disclosure may be applied to both phase calibration on the sending end and phase calibration on the receiving end. No specific restrictions are made to specific application scenarios in the embodiment of the disclosure.

In conclusion, according to the embodiment of the disclosure, the received measurement sequence is segmented according to the preset rule; since the length of the segmented measurement sequence is short and the phase in each segment is approximately linear, after determining the phase calibration factors of each of the segmented measurement sequences respectively, the phase calibration on each of the corresponding segmented measurement sequences is completed according to the phase calibration factors of each of the segmented measurement sequences, which are equivalent to dividing a non-linear measurement sequence into several approximately linear measurement sequences, and then calibrating each of the approximately linear measurement sequences using the corresponding phase calibration factor respectively, thereby greatly improving a phase calibration accuracy, and achieving an excellent phase calibration effect.

Second Embodiment

Figure 2:
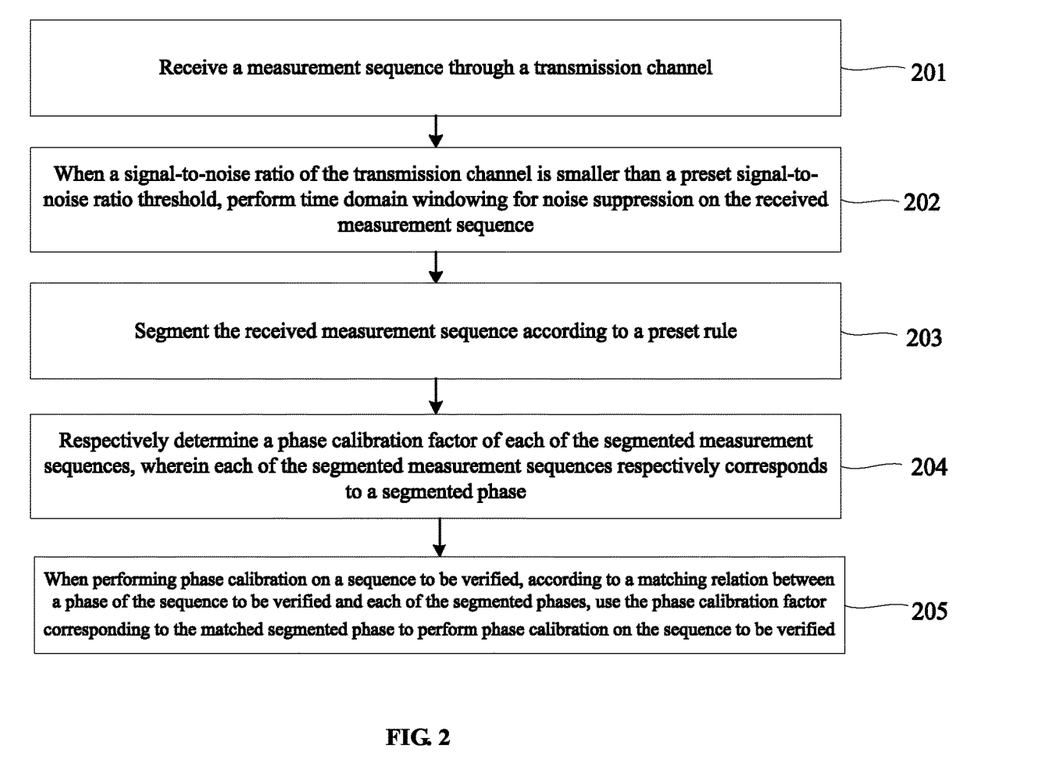
FIG. 2 is a specific flow chart of a phase calibration method provided by an embodiment of the disclosure.

Refer to FIG. 2, which illustrates a specific flow chart of a phase calibration method, wherein the method may specifically include the following steps.

In step 201, a measurement sequence is received through a transmission channel.

In step 202, when a signal-to-noise ratio of the transmission channel is smaller than a preset signal-to-noise ratio threshold, time domain windowing for noise suppression is performed on the received measurement sequence.

In the embodiment of the disclosure, since the signal-to-noise ratio of the transmission channel is small, the measurement sequence transmitted in the transmission channel will be greatly interfered. Therefore, when the signal-to-noise ratio of the transmission channel is smaller than the preset signal-to-noise ratio threshold, time domain windowing for noise suppression is performed on the received measurement sequence, which reduces influences of channel noises on the transmitted measurement sequence, thus obtaining a better phase calibration effect.

During specific application, a method of performing the time domain windowing for noise suppression may be: transforming $H_{est}$ to a time domain by IDFT (Inverse Discrete Fourier Transform), and windowing for noise suppression, then transforming $H_{est}$ back to a frequency domain through DFT (Discrete Fourier Transform). For instance, a simple method for time domain windowing is as follows: reserving N/4 sampling points around a peak value, for example, N*1/16 sampling points before the peak value and N*3/16 sampling points after the peak value, and setting the resting into 0. Those skilled in the art may also set a corresponding method of performing domain time domain windowing for noise suppression according to the actual situations, and this is not limited in the embodiment of the disclosure.

In step 203, a received measurement sequence is segmented according to a preset rule.

In step 204, a phase calibration factor of each of the segmented measurement sequences is respectively determined, wherein each of the segmented measurement sequences respectively corresponds to a segmented phase.

In step 205, when performing phase calibration on a sequence to be verified, according to a matching relation between a phase of the sequence to be verified and each of the segmented phases, the phase calibration factor corresponding to the matched segmented phase is used to perform phase calibration on the sequence to be verified.

According to the embodiment of the disclosure, the received measurement sequence is segmented according to the preset rule; since the length of the segmented measurement sequence is short and the phase in each segment is approximately linear, after determining the phase calibration factors of each of the segmented measurement sequences respectively, the phase calibration on each of the corresponding segmented measurement sequences is completed according to the phase calibration factors of each of the segmented measurement sequences, which are equivalent to dividing a non-linear measurement sequence into several approximately linear measurement sequences, and then calibrating each of the approximately linear measurement sequences using the corresponding phase calibration factor respectively, thereby greatly improving a phase calibration accuracy, and achieving an excellent phase calibration effect.

It should be noted that, for the sake of simple description, the method embodiments are all expressed as a series of action combinations, but those skilled in the art should understand that the embodiments of the present application are not limited by the described action sequences, because certain steps may be performed in other sequences or concurrently according to the embodiments of the present application. Secondly, those skilled in the art should also understand that the embodiments described in the specification are all preferred embodiments, and the actions involved are not necessarily required by the embodiments of the present application.

Third Embodiment

Figure 3:
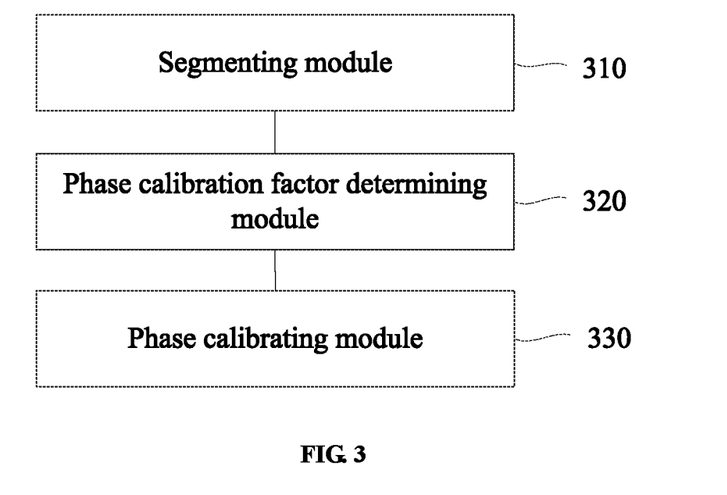
FIG. 3 is a block diagram of a phase calibration device provided by an embodiment of the disclosure.

Refer to FIG. 3, which illustrates a block diagram of a phase calibration device, wherein the device may specifically include:

a segmenting module 310 configured to segment a received measurement sequence according to a preset rule;

a phase calibration factor determining module 320 configured to respectively determine a phase calibration factor of each of the segmented measurement sequences, wherein each of the segmented measurement sequences respectively corresponds to a segmented phase; and a phase calibrating module 330 configured to, when performing phase calibration on a sequence to be verified, according to a matching relation between a phase of the sequence to be verified and each of the segmented phases, use the phase calibration factor corresponding to the matched segmented phase to perform phase calibration on the sequence to be verified.

Preferably, the segmenting module 310 includes:

a segmenting sub-module configured to segment the received measurement sequence by a greedy segmenting algorithm in a frequency domain.

Preferably, the measurement sequence is a measurement sequence generated at a preset frequency interval Δf, and the measurement sequence includes N frequency intervals, wherein N is a natural number greater than 2; and each of the frequency intervals corresponds to a sampling point in the received measurement sequence; and the segmenting sub-module includes:

a first segmenting length determining unit configured to determining a first segmenting length of a first segmented measurement sequence in the received measurement sequence, wherein an initial value of the first segmenting length is a maximum segment interval $N_{max}$ of the measurement sequence, and the maximum segment interval $N_{max}$ includes at most N/2 frequency intervals;

a phase slope determining unit configured to determine a phase slope k of the first segmented measurement sequence;

a first phase fitting curve determining unit configured to determine a first phase fitting curve $\varphi'(i) = k * f_{idx} + b$ of the first segmented measurement sequence through the phase slope and an initial phase value b of the first segmented measurement sequence, wherein $f_{idx}$ is a frequency interval index;

a difference determining unit configured to determine a difference between a first fitting phase of each of the sampling points determined according to the phase fitting curve and an actual phase of each of the sampling points of the first segmented measurement sequence;

a first segmenting length adjusting unit configured to, if the difference is greater than a preset difference threshold, reduce a number of the frequency intervals contained in the first segmenting length;

a first segmented measurement sequence determining unit configured to repeat the steps executed by the units above until the first segmenting length N1 with a difference no more than the present different threshold and the first phase fitting curve are determined;

a second segmented measurement sequence determining unit configured to use N1 as an initial value of a second segmenting length of a second segmented measurement sequence in the measurement sequence, and determine the second segmenting length N2 of the second segmented measurement sequence with a difference no more than the preset difference threshold and a second phase fitting curve; and a measurement sequence segmenting determining unit configured to repeat the steps executed by the units above until the received measurement sequence is completely segmented.

Preferably, the segmenting module 310 includes:

a measurement sequence dividing submodule configured to, when the received measurement sequence is a symmetric full-bandwidth measurement sequence, take a center frequency as a boundary to divide the full-bandwidth measurement sequence into a first frequency-band measurement sequence and a second frequency-band measurement sequence, wherein phase slopes of the first frequency-band measurement sequence and the second frequency-band measurement sequence are symmetric at the center frequency;

a first segmenting sub-module configured to perform first segmenting on the first frequency-band measurement sequence by a greedy segmenting algorithm in a frequency domain; and a second segmenting submodule configured to, according to a symmetric relation between the slopes of the first frequency-band measurement sequence and the second frequency-band measurement sequence, employ second segmenting corresponding to the first segmenting in the second frequency-band measurement sequence.

The phase calibration factor determining module 320 includes:

a second fitting phase determining submodule configured to perform linear fitting on each of the segmented measurement sequences according to a preset resolution $\Delta f_{res}$ to obtain a second fitting phase of each of the segmented measurement sequences in unit of the preset resolution, wherein the preset resolution $\Delta f_{res}$ is smaller than the frequency interval $\Delta f$; and a phase calibration factor determining submodule configured to respectively determine a phase calibration factor of each of the second fitting phases.

Figure 4:
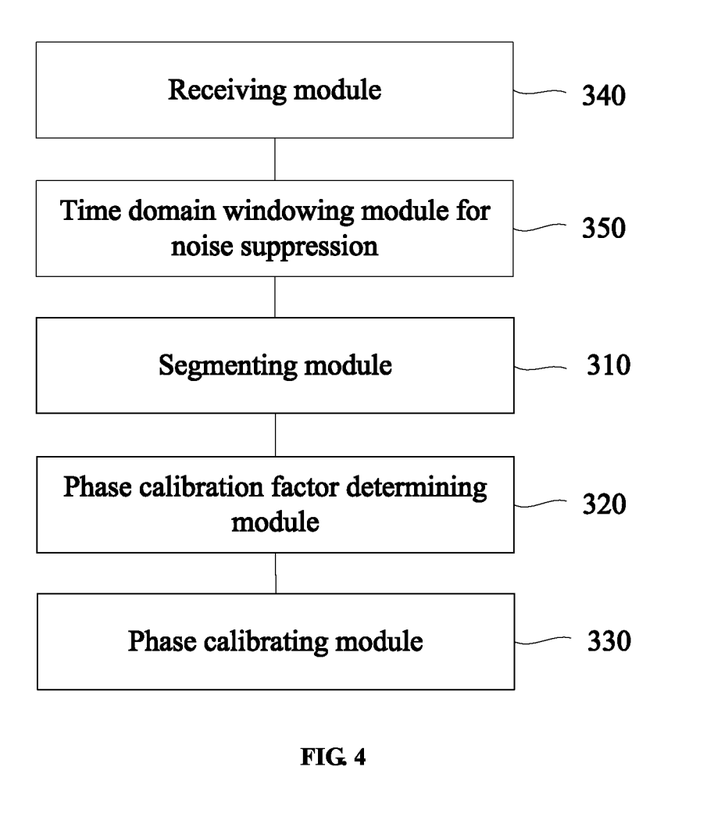
FIG. 4 is a specific block diagram of a phase calibration device provided by an embodiment of the disclosure.

Preferably, with reference to FIG. 4, and based on FIG. 3, the device further includes:

a receiving module 340 configured to receive the measurement sequence through a transmission channel; and a time domain windowing module for noise suppression 350 configured to, when a signal-to-noise ratio of the transmission channel is smaller than a preset signal-to-noise ratio threshold, perform time domain windowing for noise suppression on the received measurement sequence.

According to the embodiments of the disclosure, the received measurement sequence is segmented according to the preset rule; since the length of the segmented measurement sequence is short and the phase in each segment is approximately linear, after determining the phase calibration factors of each of the segmented measurement sequences respectively, the phase calibration on each of the corresponding segmented measurement sequences is completed according to the phase calibration factors of each of the segmented measurement sequences, which are equivalent to dividing a non-linear measurement sequence into several approximately linear measurement sequences, and then calibrating each of the approximately linear measurement sequences using the corresponding phase calibration factor respectively, thereby greatly improving a phase calibration accuracy, and achieving an excellent phase calibration effect.

As for the device embodiment, since it is basically similar to the method embodiment, the description of the device embodiment is relatively simple. For relevant points, please refer to the partial description of the method embodiment.

Various member embodiments of the disclosure may be implemented in hardware, or in software modules running on one or more processors, or in a combination thereof. Those skilled in the art will appreciate that a microprocessor or a Digital Signal Processor (DSP) may be used in practice to implement some or all of the functions of some or all of the members in the server according to the embodiments of the disclosure. The disclosure may also be implemented as a device or apparatus program (e.g., a computer program and a computer program product) for performing some or all of the methods described herein. Such a program for implementing the disclosure may be stored on a computer readable medium or may have the form of one or more signals. Such signals can be downloaded from Internet websites, or provided on carrier signals, or provided in any other form.

Figure 5:
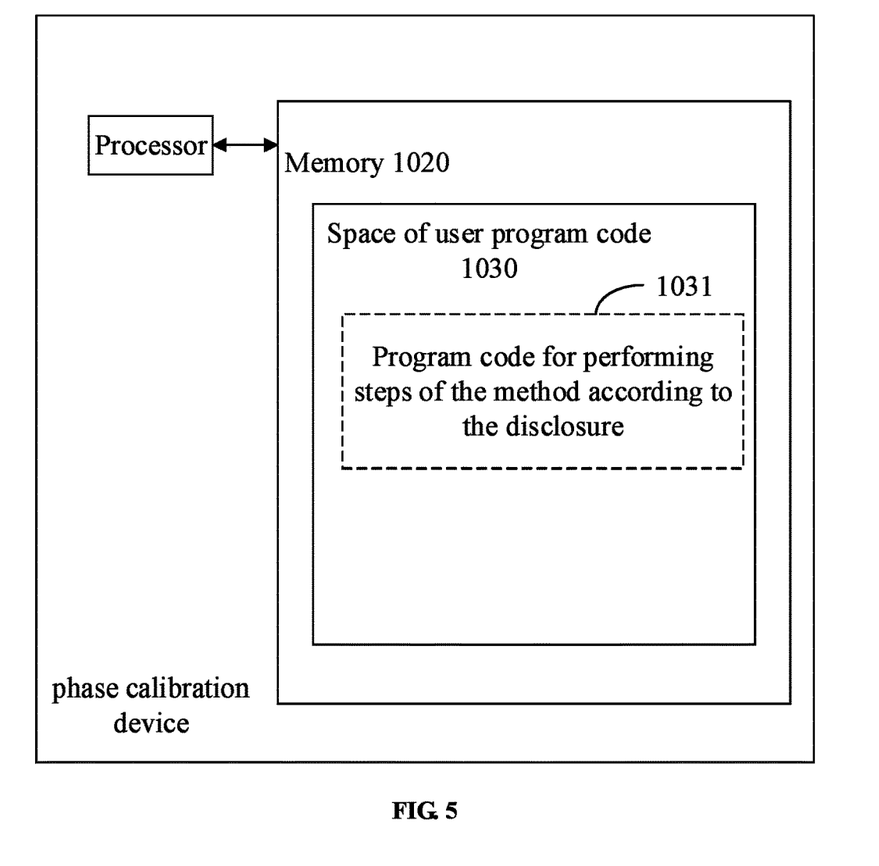
FIG. 5 illustrates a block diagram of an electronic device for performing the method according to the disclosure provided by the embodiment of the disclosure.
Figure 6:
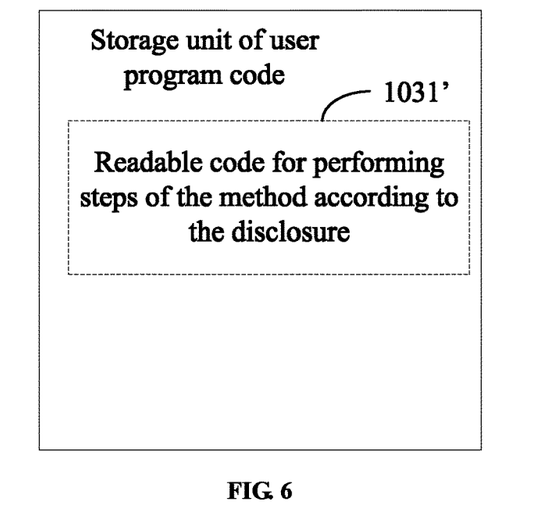
FIG. 6 illustrates a storage unit provided by an embodiment of the disclosure for holding or carrying a program code for implementing the method according to the disclosure.

For example, FIG. 5 illustrates an electronic device capable of implementing the phase calibration method according to the disclosure, for example, a server. The electronic device conventionally includes a processor 1010 and a computer program product or computer readable medium in the form of a memory 1020. The memory 1020 may be an electronic memory such as a flash memory, an EEPROM (Electrically Erasable Programmable Read Only Memory), an EPROM, a hard disk, or a ROM. The memory 1020 has a storage space 1030 of a program code 1031 for performing any method step in the above described method. For example, the storage space 1030 for the program code may include respective program codes 1031 for respectively implementing various steps in the above described method. These program codes may be read from one or more computer program products or written to the one or more computer program products. These computer program products include program code carriers such as hard disks, compact disks (CD), memory cards, or floppy disks. Such a computer program product is typically a portable or fixed storage unit as described in FIG. 6. The storage unit may have storage segments, storage spaces, and the like arranged similarly to the memory 1020 in the electronic device of FIG. 5. The program code may be compressed in an appropriate form, for example. Generally, the storage unit includes computer readable codes 1031', i.e., codes readable by a processor such as 1010. These codes, when executed by the electronic device, cause the electronic device to execute various steps in the method described above.

The embodiments in the disclosure are all described step by step, the important part of each embodiment mainly lies in the difference between other embodiments, the same or similar part between each embodiment may be referred to each other.

It should be appreciated by those skilled in this art that the embodiments of the disclosure may be provided as methods, device or computer program products. Therefore, the embodiments of the disclosure may take the form of complete hardware embodiments, complete software embodiments or software-hardware combined embodiments. Moreover, the embodiments of the disclosure may take the form of a computer program product embodied on one or more computer usable storage media (including but not limited to disk storage, CD-ROM, optical storage, etc.) in which computer usable program codes are included.

In a typical configuration, the computer device includes one or more processors (CPU), input/output interfaces, network interfaces, and memories. The memory may probably include a volatile memory, a random access memory (RAM) and/or non-volatile memory in a computer readable medium, such as a read only memory (ROM) or a flash memory (flash RAM). The memory is an example of the computer readable medium. The computer readable media include permanent and non-permanent, removable and non-removable media, which can realize information storage by any method or technology. The information may be computer readable instructions, data structures, modules of programs, or other data. Examples of the storage media for computers include, but are not limited to phase change memory (PRAM), static random access memory (SRAM), dynamic random access memory (DRAM), other types of random access memory (RANI), read only memory (ROM), electrically erasable programmable read only memory (EEPROM), flash memory or other memory technologies, read-only compact disc read-only memory (CD-ROM), digital versatile disc (DVD) or other optical storage, magnetic cassettes, magnetic tapes, magnetic disk storage or other magnetic storage devices or any other non-transmission medium, and may be used to store information that may be accessed by a computing apparatus. As defined herein, the computer readable medium does not include non-persistent computer readable media (transitory media), such as modulated data signals and carrier waves.

The disclosure is described with reference to the flow charts and/or block diagrams of the method, terminal device (system), and computer program products according to the embodiments of the disclosure. It should be appreciated that each flow and/or block in the flow charts and/or block diagrams, and combinations of the flows and/or blocks in the flow charts and/or block diagrams may be implemented by computer program instructions. These computer program instructions may be provided to a general purpose computer, a special purpose computer, an embedded processor, or a processor of other programmable phase calibration terminal device to produce a machine for the instructions executed by the computer or the processor of other programmable data processing terminal device to generate a device for implementing the functions specified in one or more flows of the flow chart and/or in one or more blocks of the block diagram.

These computer program instructions may also be provided to a computer readable memory that can guide the computer or other programmable data phase calibration terminal device to work in a given manner, so that the instructions stored in the computer readable memory generate a product including an instruction device that implements the functions specified in one or more flows of the flow chart and/or in one or more blocks of the block diagram.

These computer program instructions may also be loaded to a computer, or other programmable phase calibration terminal device, so that a series of operating steps are executed on the computer, or other programmable terminal device to produce processing implemented by the computer, so that the instructions executed in the computer or other programmable terminal device provide steps for implementing the functions specified in one or more flows of the flow chart and/or in one or more blocks of the block diagram.

Although the preferred embodiments of the disclosure have been described, those skilled in the art can make additional changes and modifications to these embodiments once they know the basic inventive concepts. Therefore, the appended claims are intended to be interpreted as including the preferred embodiments and all the changes and modifications that fall within the scope of the embodiments of the disclosure.

Finally, it should be also noted that relational terms herein such as first and second, etc., are used merely to distinguish one entity or operation from another entity or operation, and do not necessarily require or imply there is any such relation or order between these entities or operations. Furthermore, the terms "including", "comprising" or any variations thereof are intended to embrace a non-exclusive inclusion, such that a process, method, article, or terminal device including a plurality of elements includes not only those elements but also includes other elements not expressly listed, or also includes elements inherent to such a process, method, item, or terminal device. In the absence of further limitation, an element defined by the phrase "including a . . . " does not exclude the presence of additional identical element in the process, method, article, or terminal device.

The phase calibration method and the phase calibration device provided by the disclosure are described in detail above. Specific examples are applied to explain the principle and implementation of the disclosure herein. The above embodiments are only used to help understand the method of the disclosure and the core idea thereof. Meanwhile, for those of ordinary skills in the art, there will be changes in the specific implementation and application scope according to the idea of the disclosure. To sum up, the contents of this specification should not be construed as limiting the disclosure.

What is claimed is:

1. A phase calibration method, comprising:
receiving a measurement sequence through a transmission channel;
when a signal-to-noise ratio of the transmission channel is smaller than a preset signal-to-noise ratio threshold, performing a time domain windowing for a noise suppression on the measurement sequence;
segmenting the received measurement sequence according to a preset rule to obtaining segmented measurement sequences;
respectively determining a phase calibration factor of each of the segmented measurement sequences, wherein the each. of the segmented measurement sequences respectively corresponds to a segmented phase of segmented phases; and
when performing a phase calibration on a sequence to be verified, according to a matching relation between a phase of the sequence to be verified and each of the segmented phases, using the phase calibration factor corresponding to a matched segmented phase to perform the phase calibration on the sequence to be verified.

2. The phase calibration method according to claim 1, wherein the step of segmenting the received measurement sequence according to the preset rule comprises:
segmenting the received measurement sequence by a greedy segmenting algorithm in a frequency domain.

3. The phase calibration method according to claim 2, wherein the received measurement sequence is a measurement sequence generated at a preset frequency interval $\Delta f$, and the measurement sequence comprises N frequency intervals, wherein N is a natural number greater than 2; and each of the N frequency intervals corresponds to a sampling point of sampling points in the received measurement sequence; and
the step of segmenting the received measurement sequence by the greedy segmenting algorithm in the frequency domain comprises:
determining a first segmenting length N1 of a first segmented measurement sequence in the received measurement sequence, wherein an initial value of the first segmenting length N1 is a maximum segment interval $N_{max}$ of the measurement sequence, and the maximum segment interval $N_{max}$ comprises at most N/2 frequency intervals;
determining a phase slope k of the first segmented measurement sequence;
determining a first phase fitting curve $\varphi'(i)=k*f_{idx}+b$ of the first segmented measurement sequence through the phase slope k and an initial phase value h of the first segmented measurement sequence, wherein $f_{idx}$ is a frequency interval index;
determining a difference value between a first fitting phase of each of the sampling points determined according to the first phase fitting curve and an actual phase of the each of the sampling points of the first segmented measurement sequence;
if the difference value is greater than a preset difference value threshold, reducing a number of the N frequency intervals contained in the first segmenting length N1;
repeating above steps until the first segmenting length N1 and the first phase fitting curve with the difference value no more than the present difference value threshold are determined;
using the first segmenting length N1 as an initial value of a second segmenting length N2 of a second segmented measurement sequence in the measurement sequence, and determining the second segmenting length N2 of the second segmented measurement sequence and a second phase fitting curve with the difference value no more than the preset difference value threshold; and
repeating the above steps until the received measurement sequence is completely segmented.

4. The phase calibration method according to claim 1, wherein the step of segmenting the received measurement sequence according to the preset rule comprises:
when the received measurement sequence is a symmetric full-bandwidth measurement sequence, taking a center frequency as a boundary to divide the symmetric full-bandwidth measurement sequence into a first frequency-band measurement sequence and a second frequency-band measurement sequence, wherein phase slopes of the first frequency-band measurement sequence and the second frequency-band measurement sequence are symmetric at the center frequency,
performing a first segmenting on the first frequency-band measurement sequence by a greedy segmenting algorithm in a frequency domain; and
according to a symmetric relation between the phase slopes of the first frequency-band measurement sequence and the second frequency-band measurement sequence, employing a second segmenting corresponding to the first segmenting in the second frequency-band measurement sequence.

5. The phase calibration method according to claim 3, wherein the step of respectively determining the phase calibration factor of the each of the segmented measurement sequences comprises:
performing a linear fitting on the each of the segmented measurement sequences according to a preset resolution $\Delta f_{res}$ to obtain a second fitting phase of second fitting phases of the each of the segmented measurement sequences in a unit of the preset resolution, wherein the preset resolution $\Delta f_{res}$ is smaller than the preset frequency interval $\Delta f$; and
respectively determining the phase calibration factor corresponding to each of the second fitting phases.

6. A phase calibration device, comprising:
a memory having instructions stored on the memory;
a processor configured to execute instructions to perform the following operations, comprising:
receiving a measurement sequence through a transmission channel;
when a signal-to-noise ratio of the transmission channel is smaller than a preset signal-to-noise ratio threshold, performing a time domain windowing for a noise suppression on the received measurement sequence:
segmenting the received measurement sequence according to a preset rule to obtaining segmented measurement sequences;
respectively determining a phase calibration factor of each of the segmented measurement sequences, wherein the each of the segmented measurement sequences respectively corresponds to a segmented phase of segmented phases; and
when performing a phase calibration on a sequence to be verified, according to a matching relation between a phase of the sequence to be verified and each of the segmented phases, using the phase calibration factor corresponding to a matched segmented phase to perform the phase calibration on the sequence to be verified.

7. The phase calibration device according to claim 6, wherein the step of segmenting the received measurement sequence according to the preset rule comprises:
segmenting the received measurement sequence by a greedy segmenting algorithm in a frequency domain.

8. The phase calibration device according to claim 7, wherein the received measurement sequence is a measurement sequence generated at a preset frequency interval $\Delta f$, and the measurement sequence comprises N frequency intervals, wherein N is a natural number greater than 2; and each of the N frequency intervals corresponds to a sampling point of sampling points in the received measurement sequence; and the step of segmenting the received measurement sequence by the greedy segmenting algorithm in the frequency domain comprises:
determining a first segmenting length N1 of a first segmented measurement sequence in the received measurement sequence, wherein an initial value of the first segmenting length N1 is a maximum segment interval $N_{max}$ of the measurement sequence, and the maximum segment interval $N_{max}$ comprises at most N/2 frequency intervals;

determining a phase slope k of the first segmented measurement sequence;

determining a first phase fitting curve $\varphi'(i)=k*f_{idx}+b$ of the first segmented measurement sequence through the phase slope k and an initial phase value b of the first segmented measurement sequence, wherein $f_{idx}$ is a frequency interval index;

determining a difference value between a first fitting phase of each of the sampling points determined according to the first phase fitting curve and an actual phase of the each of the sampling points of the first segmented measurement sequence;

if the difference value is greater than a preset difference value threshold, reducing a number of the N frequency intervals contained in the first segmenting length N1;

repeating steps above until the first segmenting length N1 and the first phase fitting curve with the difference value no more than a present different threshold are determined;

using the first segmenting length N1 as an initial value of a second segmenting length N2 of a second segmented measurement sequence in the measurement sequence, and determining the second segmenting length N2 of the second segmented measurement sequence and a second phase fitting curve with the difference value no more than the preset difference threshold; and repeating the steps above until the received measurement sequence is completely segmented.

9. The phase calibration device according to claim 6, wherein the step of segmenting the received measurement sequence according to the preset rule comprises:

when the received measurement sequence is a symmetric full-bandwidth measurement sequence, taking a center frequency as a boundary to divide the symmetric full-bandwidth measurement sequence into a first frequency-band measurement sequence and a second frequency-band measurement sequence, wherein phase slopes of the first frequency-band measurement sequence and the second frequency-band measurement sequence are symmetric at the center frequency;

performing a first segmenting on the first frequency-band measurement sequence by a greedy segmenting algorithm in a frequency domain; and according to a symmetric relation between the phase slopes of the first frequency-band measurement sequence and the second frequency-band measurement sequence, employing a second segmenting corresponding to the first segmenting in the second frequency-band measurement sequence.

10. The phase calibration device according to claim 6, wherein the step of respectively determining the phase calibration factor of the each of the segmented measurement sequences comprises:

performing a linear fitting on the each of the segmented measurement sequences according to a preset resolution $\Delta f_{res}$ to obtain a second fitting phase of the each of the segmented measurement sequences in a unit of the preset resolution $\Delta f_{res}$, wherein the preset resolution $\Delta f_{res}$ is smaller than a preset frequency interval $\Delta f$; and respectively determining a phase calibration factor of each of second fitting phases.

11. A non-transitory computer-readable medium storing a computer program including instructions that when executed by a processor of a phase calibration device, cause the phase calibration device to perform the phase calibration method according to claim 1.

* * * * *